No. 872,051. PATENTED NOV. 26, 1907.
P. F. CARROLL.
FEEDING DEVICE FOR DOUGH MACHINES.
APPLICATION FILED AUG. 6, 1906.

Witnesses:
Chas. F. Bassett
M. A. Milord

Inventor
Philip F. Carroll
By Frederick Benjamin
Atty.

THE NORRIS PETERS CO., WASHINGTON, D. C.

UNITED STATES PATENT OFFICE.

PHILIP F. CARROLL, OF JOLIET, ILLINOIS, ASSIGNOR TO CHAMPION MACHINERY COMPANY, OF JOLIET, ILLINOIS, A CORPORATION OF ILLINOIS.

FEEDING DEVICE FOR DOUGH-MACHINES.

No. 872,051. Specification of Letters Patent. Patented Nov. 26, 1907.

Application filed August 6, 1906. Serial No. 329,498.

*To all whom it may concern:*

Be it known that I, PHILIP F. CARROLL, citizen of the United States, residing at Joliet, in the county of Will and State of Illinois, have invented certain new and useful Improvements in Feeding Devices for Dough-Machines, of which the following is a specification.

This invention relates to improvements in means for feeding dough from a hopper into a receptacle where it receives further operations.

The especial object attained by my invention is the feeding of the dough without appreciable squeezing, it having been demonstrated that any operation on many kinds of dough which has the effect of forcing out the gases of fermentation, more or less impairs its quality.

In dough dividing machines and dough molding machines of well known types, it is customary to feed the dough from the hopper in which it is placed *en masse*, by two or more rollers, either smooth or corrugated, which draw the dough from between them, and this action has been found to seriously impair its quality because of the expression of the gases and the mutilation of the grain of the dough. My invention avoids this difficulty.

In the accompanying drawing, I have shown an adaptation of my invention in the following views:—

Figure 1:
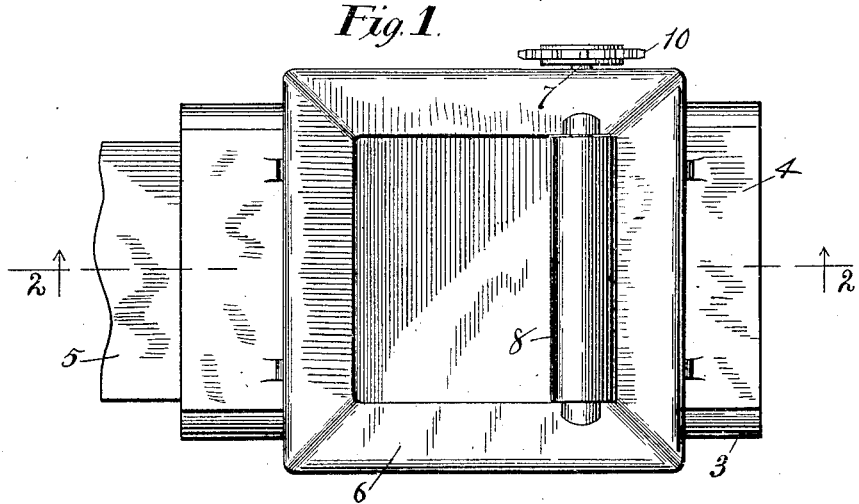
Figure 2:
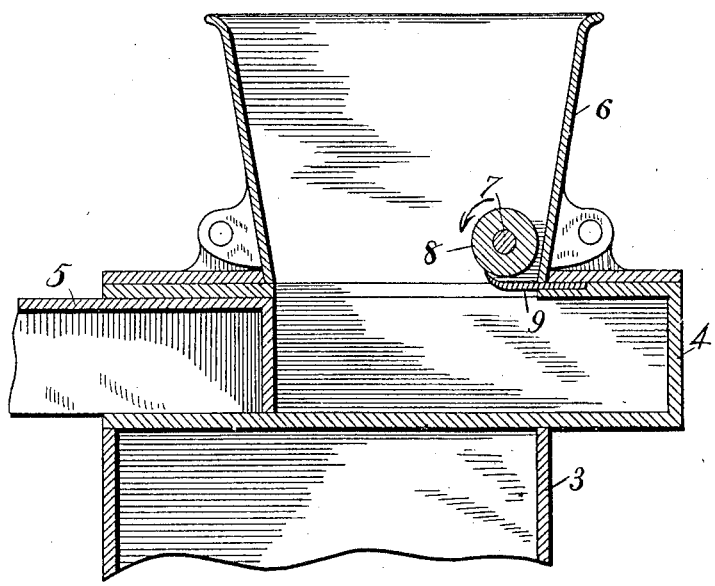

Figure 1 is a top-plan view of the hopper and a portion of a dough machine to which my invention has been applied; Fig. 2 is a section on the line 2—2 of Fig. 1.

Referring to the details of the drawing, 3 represents a portion of the frame of a dough dividing machine upon which is secured a loaf-forming chamber 4 and a piston 5.

6 represents a hopper of common form, and 7 a shaft which extends transversely of the hopper, is suitably journaled in same and has a sprocket wheel 10 secured on one end which may be driven from any suitable source and in any well known manner. On the shaft is mounted a roller 8, and secured near the bottom of the roller, with its edge in contact therewith, is a scraper 9. It will be noted that the position of the roller is at one side of the bottom of the hopper and, compared with the diameter of the throat of the latter, is of small cross-diameter so that it projects but slightly into the passageway between the hopper and the dough-receiving chamber 4. The roller 8, when rotated in the direction indicated by the arrow in Fig. 2, engages a mass of dough placed in the hopper with sufficient frictional contact to draw the dough gradually down into the chamber 4 without exerting an appreciable amount of pressure, and therefore without expressing the gases or rupturing the grain or fibers of the dough.

I do not wish to be limited in the application of my invention to any particular class of dough manipulating machines, as it may be utilized in any form of machine where it is necessary to feed portions *en masse* of dough to a chamber adjacent to the feed hopper, and where it is desirable to avoid squeezing or wedging the dough between unyielding surfaces or contracted walls.

What I claim is:—

1. In a dough machine, a hopper adapted to receive a mass of dough, a feed roller mounted at the discharge end of said hopper, a scraper for said roller, a chamber adapted to receive the dough from the hopper, and a reciprocating plunger arranged to enter said chamber at a point opposite said roller, and coöperating with said roller to draw the dough into said chamber.

2. In a dough machine, a hopper adapted to receive a mass of dough, a feed roller of relatively small diameter mounted at one side of the discharge end of said hopper, a scraper for said roller, a chamber adapted to receive the dough from said hopper, and a reciprocating plunger arranged to enter said chamber at a point opposite said roller, whereby the plunger will coöperate with the roller in feeding the dough into said chamber in advance of the plunger.

In testimony whereof I affix my signature in presence of two witnesses.

PHILIP F. CARROLL.

Witnesses:
F. BENJAMIN,
WM. B. MOORE.